(12) United States Patent
Ho et al.

(10) Patent No.: US 11,144,131 B1
(45) Date of Patent: Oct. 12, 2021

(54) ILLUMINATED MODULE AND KEYBOARD THEREOF

(71) Applicant: Chicony Power Technology Co., Ltd., New Taipei (TW)

(72) Inventors: Hsuan-Wei Ho, New Taipei (TW); Yi-Cheng Chang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/015,960

(22) Filed: Sep. 9, 2020

(30) Foreign Application Priority Data

Jul. 13, 2020 (TW) .................................. 109123637

(51) Int. Cl.
  *G06F 3/02* (2006.01)
  *F21V 9/08* (2018.01)
  *F21V 8/00* (2006.01)

(52) U.S. Cl.
  CPC .............. *G06F 3/0202* (2013.01); *F21V 9/08* (2013.01); *G02B 6/0035* (2013.01)

(58) Field of Classification Search
  CPC ........ G06F 3/0202; G02B 6/0035; F21V 9/08
  See application file for complete search history.

(56) References Cited

U.S. PATENT DOCUMENTS

| | | | | |
|---|---|---|---|---|
| 2003/0001994 A1* | 1/2003 | Iino | .................... | G02F 1/133555 349/113 |
| 2014/0192515 A1* | 7/2014 | Kim | .................. | G02F 1/133553 362/97.1 |
| 2014/0233258 A1* | 8/2014 | Zhang | .................... | G02B 6/005 362/607 |
| 2014/0327846 A1* | 11/2014 | Hata | ........................ | G06F 3/041 349/12 |
| 2016/0035516 A1 | 2/2016 | Tosh et al. | | |
| 2017/0276997 A1* | 9/2017 | Yoshinaga | .......... | H01L 27/3213 |
| 2018/0071862 A1* | 3/2018 | Yen | ..................... | H01H 13/7013 |
| 2020/0042101 A1* | 2/2020 | Cheng | .................... | H01H 13/83 |
| 2020/0043681 A1* | 2/2020 | Chen | .................... | G02B 6/0036 |

FOREIGN PATENT DOCUMENTS

| | | |
|---|---|---|
| CN | 110208899 A | 9/2019 |
| TW | M528464 U | 9/2016 |
| TW | 201911356 A | 3/2019 |
| TW | M582682 U | 8/2019 |

* cited by examiner

*Primary Examiner* — Rajarshi Chakraborty
*Assistant Examiner* — Glenn D Zimmerman
(74) *Attorney, Agent, or Firm* — Innovation Capital Law Group; Vic Lin

(57) ABSTRACT

An illuminated module includes a light source assembly, a light guide plate, a filter, and a light-shielding sheet. The light source assembly includes a light-emitting component, the light-emitting component being configured to emit light. The light guide plate is on a traveling route of the light, and has a surface and a microstructure. The filter is located on the surface, and has a first area and a second area, the first area and the second area corresponding to the microstructure, where the first area has a first filter characteristic, the second area has a second filter characteristic, and the first filter characteristic is different from the second filter characteristic. The light-shielding sheet is located on the other side of the light guide plate opposite to the filter, and has a transparent opening corresponding to the microstructure. In addition, an illuminated keyboard is provided.

14 Claims, 9 Drawing Sheets

ILLUMINATED MODULE AND KEYBOARD THEREOF

CROSS-REFERENCE TO RELATED APPLICATION

This non-provisional application claims priority under 35 U.S.C. § 119(a) to Patent Application No. 109123637 filed in Taiwan, R.O.C. on Jul. 13, 2020, the entire contents of which are hereby incorporated by reference.

BACKGROUND

Technical Field

The present invention relates to an illuminated module and a keyboard thereof, and in particular, to an illuminated module adapted to display a plurality of colors and a keyboard thereof.

Related Art

A conventional physical keyboard may be in a wired or wireless connection to a computer for a user to operate, to further input control instructions and required text information. In a generally bright work environment with a sufficient light source, an external light source is irradiated on a keyboard, so that a user may clearly perceive locations of keys and characters marked on keycaps, and press at least one key to input information. The pressed key transmits a corresponding electrical signal to the computer for the user to input information and control the computer in time.

However, the inventor realizes that in a dark environment, because of insufficient brightness of external light, it is not easy for a user to clearly see the marked characters on the keycaps. Consequently, the user cannot find required keys, and even presses a wrong key when misperceiving a character, resulting in a wrong action of the computer. In view of this, some embodiments of the present invention provide an illuminated module and a keyboard thereof, and in particular, to an illuminated module adapted to display a plurality of colors and a keyboard thereof, to overcome the deficiency of the conventional technology.

SUMMARY

To achieve the foregoing objective, an embodiment of the present invention provides an illuminated module, including: a light source assembly, a light guide plate, a filter, and a light-shielding sheet. The light source assembly includes a light-emitting component, the light-emitting component being configured to emit light. The light guide plate is disposed on a traveling route of the light, and has a surface and a microstructure, the microstructure being configured to change a propagation direction of the light incident on the microstructure toward the surface. The filter is located on the surface, and has a first area and a second area, the first area and the second area corresponding to the microstructure, where the first area has a first filter characteristic, the second area has a second filter characteristic, and the first filter characteristic is different from the second filter characteristic. The light-shielding sheet is located on the other side of the light guide plate opposite to the filter, and has a transparent opening, the transparent opening corresponding to the microstructure.

According to some embodiments of the present invention, the first filter characteristic is a first filter wave band, the second filter characteristic is a second filter wave band, and the first filter wave band is different from the second filter wave band.

According to some embodiments of the present invention, the first filter characteristic is a first light transmittance, the second filter characteristic is a second light transmittance, and the first light transmittance is different from the second light transmittance.

According to some embodiments of the present invention, the light guide plate has a first opening, the filter has a second opening, and the light-shielding sheet has a third opening, where the first opening, the second opening, and the third opening vertically correspond to each other to form a through hole.

According to some embodiments of the present invention, an outer surface of the light-shielding sheet further has a light-shielding ring, surrounding the through hole.

According to some embodiments of the present invention, the illuminated module further includes a glue film. The glue film is between the filter and the light-shielding sheet, and on the filter and an outer periphery of the light-shielding sheet. The glue film is configured to glue the filter and the light-shielding sheet. The glue film has a channel, and an inner side and an outer side of the glue film are in communication with each other through the channel.

According to some embodiments of the present invention, an illuminated keyboard includes an illuminated module and a keyboard assembly. The illuminated module includes a light source assembly, a light guide plate, a filter, and a light-shielding sheet. The light source assembly includes a light-emitting component, the light-emitting component being configured to emit light. The light guide plate is disposed on a traveling route of the light, and has a surface and a microstructure, the microstructure being configured to change a propagation direction of the light incident on the microstructure toward the surface. The filter is on the surface, and has a first area and a second area, the first area and the second area corresponding to the microstructure, where the first area has a first filter characteristic, the second area has a second filter characteristic, and the first filter characteristic is different from the second filter characteristic. The light-shielding sheet is on an other side of the light guide plate opposite to the filter, and has a transparent opening, the transparent opening corresponding to the microstructure. The keyboard assembly is above the light-shielding sheet. The transparent opening faces toward the keyboard assembly.

According to some embodiments of the present invention, the keyboard assembly includes a key, the key corresponds to a single-key orthographic projection area in the filter, the first area corresponds to the center of the single-key orthographic projection area, and the second area surrounds the first area.

According to some embodiments of the present invention, the keyboard assembly includes a key, the key corresponds to a single-key orthographic projection area in the filter, the first area corresponds to a half area of the single-key orthographic projection area, and the second area corresponds to an other half area other than the half area.

According to some embodiments of the present invention, the keyboard assembly includes a plurality of keys, the plurality of keys are divided into a first key area and a second key area, the first area corresponds to a first orthographic projection area in the filter corresponding to the first key area, and the second area corresponds to a second orthographic projection area in the filter corresponding to the second key area.

Therefore, according to some embodiments, the illuminated module performs filtering processing in different proportions according to optical characteristics, such as light intensity and a light wavelength, through the first area and the second area that have different filter characteristics in the filter and by using the filter located between the light-shielding sheet and the light guide plate, so that light irradiated on the keyboard assembly generates a visual effect change, and backlight with different colors/saturations/brightness is displayed to highlight specific keys. Therefore, it is convenient for a user to view, and the user can correctly press a required key in an environment without light. For a user, some keys have specific operation functions and are pressed frequently. For example, keys such as W, A, S and D are respectively directional function keys usually used in specific scenarios. According to some embodiments, the illuminated module can illuminate keys having specific functions in the keyboard assembly. Backlight with different colors is displayed in different areas to highlight locations of the keys and marked characters, which helps improve efficiency and accuracy of a human-factor interface operation of the illuminated keyboard.

The objectives, technical content, and features of the present invention and the efficacy achieved by the present invention are easily understood in the following detailed descriptions by using the specific embodiments with reference to the accompanying drawings.

DETAILED DESCRIPTION

The embodiments of the present invention will be described in detail below by way of example and with reference to the accompanying drawings. In the description of this specification, many specific details are provided to provide a thorough understanding of the present invention. However, the present invention may be implemented without some or all of the specific details. The same or similar components in the figures will be denoted by the same or similar symbols. It should be particularly noted that the figures are for illustrative purposes only and are not intended to represent the actual size or quantity of components. To make the figures be concise, some details may be not completely drawn.

Figure 1A:
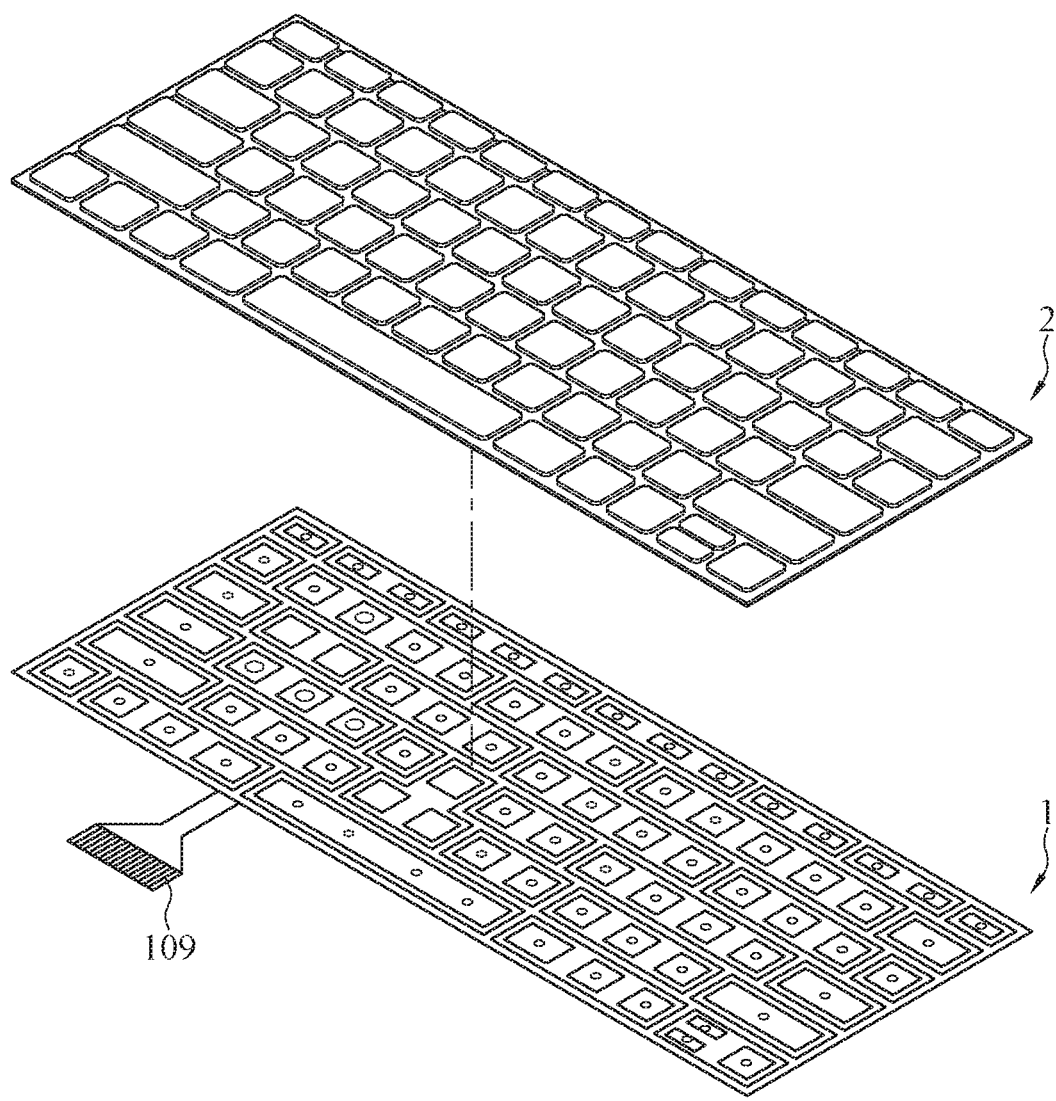
FIG. 1A is a schematic three-dimensional exploded view of an illuminated keyboard according to an embodiment.
Figure 1B:
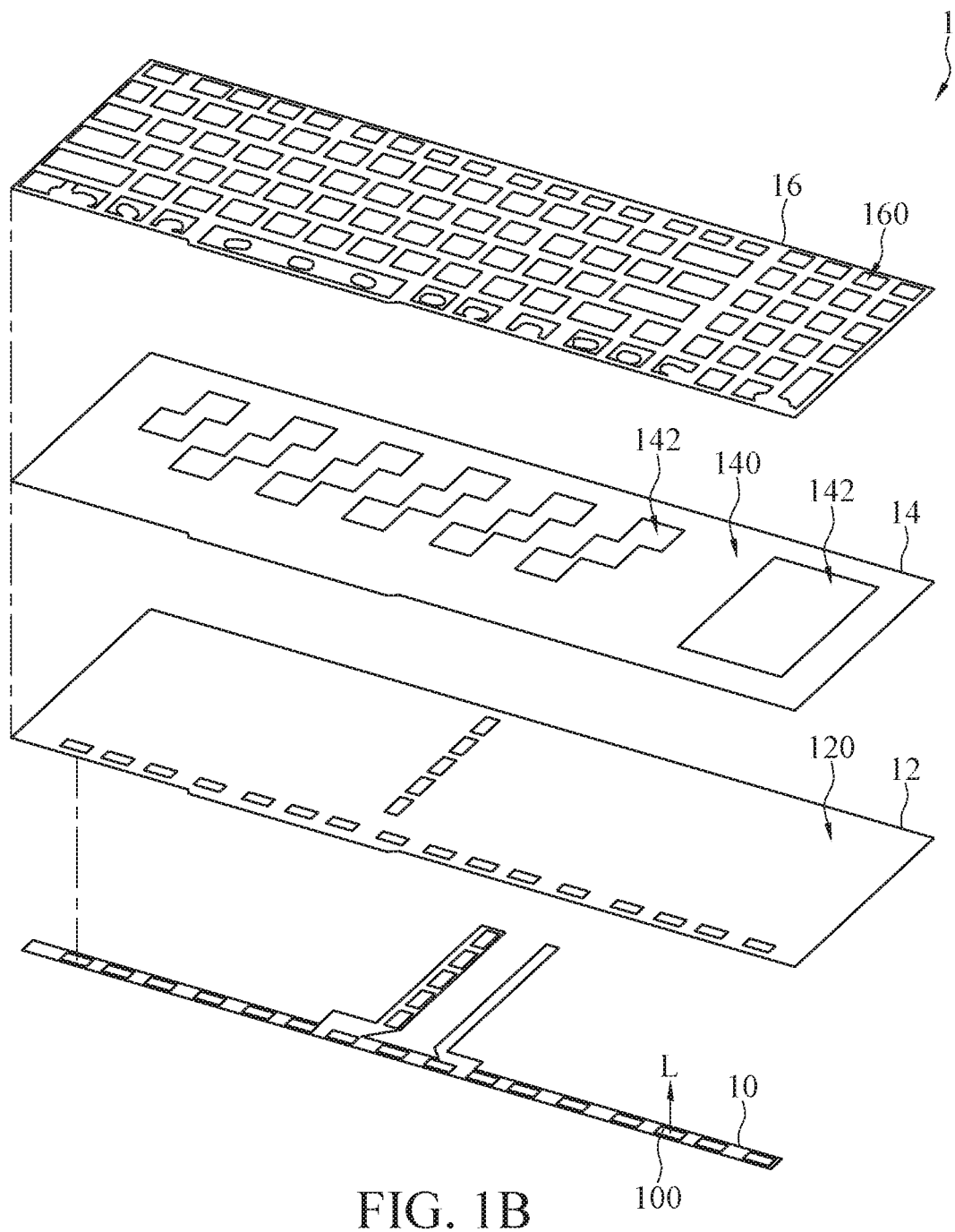
FIG. 1B is a schematic three-dimensional exploded view of an illuminated module according to an embodiment.
Figure 2:
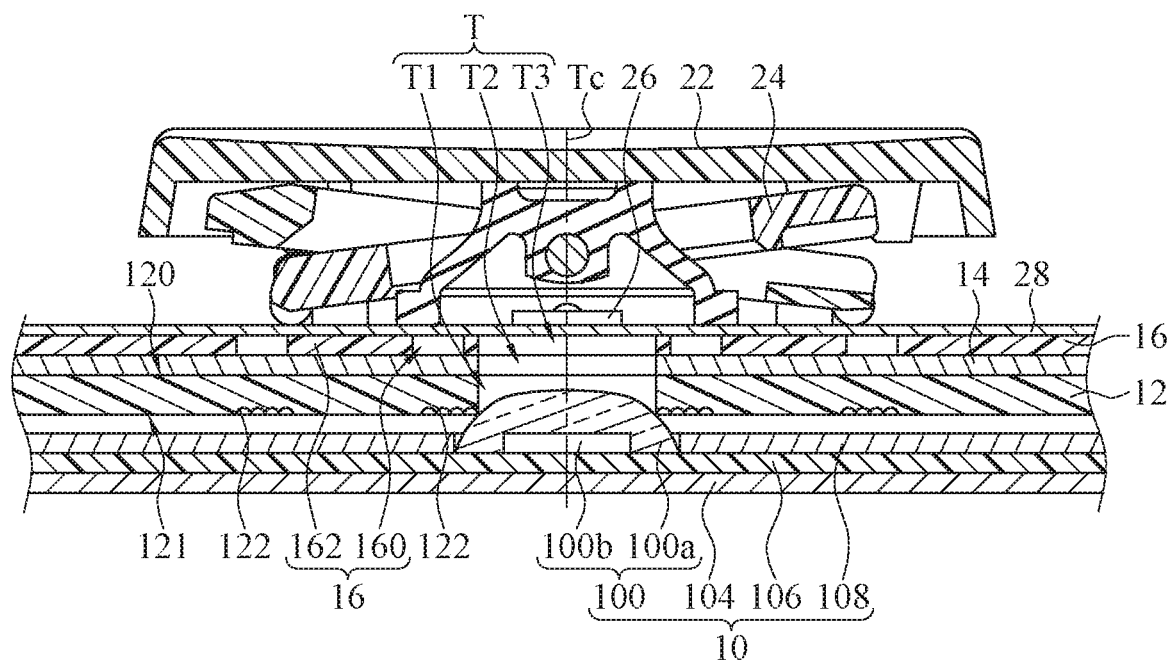
FIG. 2 is a schematic side view of an illuminated keyboard according to an embodiment.

FIG. 1A is a schematic three-dimensional exploded view of an illuminated keyboard according to some embodiments of the present invention. FIG. 1B is a schematic three-dimensional exploded view of an illuminated module according to some embodiments of the present invention. FIG. 2 is a schematic side view of an illuminated keyboard according to some embodiments of the present invention.

Referring to FIG. 1A and FIG. 2 together, according to some embodiments of the present invention, an illuminated keyboard includes an illuminated module 1 and a keyboard assembly 2, superposed on each other. When used, the illuminated module 1 is configured to illuminate at least one or more keys 22 in the keyboard assembly 2 for a user to view and operate.

Referring to FIG. 1B, according to some embodiments, the illuminated module 1 includes a light source assembly 10, a light guide plate 12, a filter 14, and a light-shielding sheet 16. The light source assembly 10 includes one or more light-emitting components 100. The light-emitting component 100 faces the light guide plate 12, and emits light L.

As shown in FIG. 2, in some embodiments, the light-emitting component 100 may be, but is not limited to, a light-emitting diode component. Herein, the light-emitting component 100 includes a lens 100a and a light-emitting chip 100b. The light-emitting chip 100b may be, but is not limited to, a light-emitting diode chip. The lens 100a covers and encapsulates the light-emitting chip 100b. The lens 100a is configured to adjust a light shape of the light L emitted by the light-emitting chip 100b, to enable the light shape to be more suitable for a light guide design of the light guide plate 12. In some embodiments, the light L emitted by a plurality of light-emitting components 100 of the light source assembly 10 has the same color. In some embodiments, the light L emitted by at least two of a plurality of light-emitting components 100 of the light source assembly 10 has different colors.

The light guide plate 12 is disposed on a traveling path of the light L. Referring to FIG. 2, in some embodiments, the light-emitting component 100 is located on a bottom 121 of the light guide plate 12, and emits light toward a through hole T. Specifically, the light L emitted by the light-emitting component 100 is propagated toward the through hole T. For example, a main optical axis of the light-emitting component 100 is parallel to a central axis Tc of the through hole T or an acute angle is included between the main optical axis of the light-emitting component 100 and the central axis Tc of the through hole T. The light L emitted by the light-emitting component 100 can be propagated toward the through hole T, so that the light L can fully enter the light guide plate 12. Herein, the light L enters the interior of the light guide plate 12 from a side wall of a first opening T1 of the light guide plate 12, and illuminates the entire light guide plate 12 through a total reflection effect, to improve a light utilization rate. However, in other embodiments (not shown in the figures), the light-emitting component 100 may be located on an outer edge side of the light guide plate 12, and emits light L toward the outermost side wall of the light guide plate 12. The light L enters the interior of the light guide plate 12 from the outermost side wall of the light guide plate 12, and illuminates the entire light guide plate 12 through a total reflection effect, to improve a light utilization rate.

The light guide plate 12 has a surface 120 and a microstructure 122. The microstructure 122 corresponds to the surface 120, and the microstructure 122 is configured to change a propagation direction of the light L incident on the microstructure 122 toward the surface 120. In some embodiments, the microstructure 122 is located on the bottom 121 of the light guide plate 12, and is disposed opposite to the surface 120. In some embodiments, the microstructure 122 is formed by a plurality of dots (or referred to as lattice points or light spots), which may be, but is not limited to, convex dots or concave dots. The microstructure 122 may be in any shape, for example, an irregular shape, a conical shape, a square, a triangle, or a trapezoid. In some examples, the dots may be concave dots concaving in the light guide plate 12 instead of protruding from the bottom 121, or may be convex dots protruding out of the bottom 121 toward the outside of the light guide plate 12. Shapes and sizes of the dots, a distance between adjacent convex dots, and/or a distance between concave dots may be adjusted according to a light shape of light emitted by the light-emitting component 100, a shape of the through hole T viewing from the top, a material of the light guide plate 12, a surface roughness degree of the light guide plate 12, and the like. A better design solution may be obtained for the adjustment through experiment. In addition, in some embodiments, the microstructure 122 may alternatively be implemented by using lattice points or lattice lines formed by printing ink on the bottom 121 of the light guide plate 12. Therefore, the light guide plate 12 receives the light L emitted by the light-emitting component 100, so that the light L enters the interior of the light guide plate 12 for total reflection, and is scattered when coming across the microstructure 122, to generate a predetermined light-emitting effect.

Referring to FIG. 1B together, the filter 14 is located on the surface 120 of the light guide plate 12, that is, the filter 14 is located between the light guide plate 12 and the light-shielding sheet 16. The filter 14 has a first area 140 and a second area 142. There may be one or more first areas 140, so as to form a continuous area or a plurality of separated sub-areas. There may also be one or more second areas 142, so as to form a continuous area or a plurality of separated sub-areas. The first area 140 and the second area 142 respectively correspond to the microstructure 122, to receive the light L reflected by the microstructure 122. The first area 140 has a first filter characteristic, the second area 142 has a second filter characteristic, and the first filter characteristic is different from the second filter characteristic. In some embodiments, for the first filter characteristic and the second filter characteristic, filtering processing in different proportions may be respectively performed according to optical characteristics such as light intensity and a light wavelength. In an example, not performing filtering processing is also a filter characteristic and effect. For example, the second filter characteristic that is different from the first filter characteristic is implemented in a manner, for example, by setting a transparent sheet or a hollow-out opening in the second area 142. Therefore, the first area 140 and the second area 142 respectively receive the light L reflected by the microstructure 122, so that the light L passes through at least one of the first area 140 and the second area 142, and is propagated toward the light-shielding sheet 16 to illuminate the keys 22, for a user to view from the top of the illuminated keyboard.

The light-shielding sheet 16 is located on the other side of the light guide plate 12 opposite to the filter 14, that is, the light-shielding sheet 16 is located between the filter 14 and the keyboard assembly 2. The light-shielding sheet 16 has a transparent opening 160 and a body 162. There may be one or more transparent openings 160, so as to form a main opening area or a plurality of separated secondary opening areas. The transparent opening 160 corresponds to the microstructure 122, that is, an orthographic projection of the transparent opening 160 relative to the light guide plate 12 is roughly overlapped on the microstructure 122, and the body 162 of the light-shielding sheet 16 is configured to shield the light L from the light guide plate 12, so that the light L under the body 162 of the light-shielding sheet 16 hardly penetrates the light-shielding sheet 16. Therefore, total reflection propagation is performed on the light L in the light guide plate 12. A part of the light L is scattered by the microstructure 122 to only emit upward from the transparent opening 160, and the remaining of the light L is blocked/reflected by the body 162 of the light-shielding sheet 16 back to the light guide plate 12 to avoid a light leakage phenomenon.

As shown in FIG. 1A, the light source assembly 10 of the illuminated module 1 has a flat cable 109. The flat cable 109 is configured to be electrically connected to an external device, and the external device is, for example, but is not limited to, a control system of a computer. The control system of the computer may control light emitting of the light-emitting component 100 of the light source assembly 10. The light guide plate 12 is configured to guide the light L emitted by the light source assembly 10, so that the light L passes through the filter 14 and is irradiated toward the keys 22. Therefore, a user may clearly view characters on the keys 22 with weak environmental light or without environmental light.

As shown in FIG. 2, the keyboard assembly 2 includes a plurality of keys 22, a plurality of elastic assemblies 24, a plurality of switches 26, and a switch circuit 28. Functions of the keys 22, the elastic assemblies 24, and the switches 26 are in a one-to-one correspondence. The switches 26 are electrically connected to the switch circuit 28. The elastic assembly 24 always maintains a pushing force, to maintain the key 22 in a location shown in FIG. 2. When the user presses the key 22, the lower part of the key 22 presses against the switch 26. After detecting that the switch 26 is pressed against, the switch circuit 28 outputs a signal corresponding to the key 22. When the user loosens the key 22, the elastic assembly 24 pushes the key 22 back to the location shown in FIG. 2. In some embodiments, the elastic assembly 24 is, but is not limited to, a scissors-type mechanism. In some other embodiments, the elastic assembly 24 may alternatively be a volcanic vent-type mechanism, a column-type mechanism, a butterfly-type mechanism, or the like.

According to the foregoing structure, the illuminated module 1 performs filtering processing in different proportions according to optical characteristics, such as light intensity and a light wavelength, through the first area 140 and the second area 142 that have different filter characteristics in the filter 14 and by using the filter 14 located between the light-shielding sheet 16 and the light guide plate 12, so that light L irradiated on the keyboard assembly 2 generates a visual effect change, and backlight with different colors/saturations/brightness is displayed to highlight specific keys 22. Therefore, it is convenient for a user to view, and the user can correctly press a required key 22 in an environment without light, which helps improve efficiency and accuracy of a human-factor interface operation of the illuminated keyboard.

In some embodiments, the first filter characteristic is a first filter wave band, the second filter characteristic is a second filter wave band, and the first filter wave band is different from the second filter wave band. The "difference" may be, but is not limited to, that a filter wave band of the first filter characteristic is completely different from, partially overlaps with, or not completely the same as a filter wave band of the second filter characteristic. For example, the first filter wave band of the first filter characteristic completely covers the second filter wave band of the second filter characteristic, and a range of the first filter wave band is greater than that of the second filter wave band. Therefore, the first area 140 and the second area 142 respectively emit light L having different optical wavelengths. The optical wavelength may be defined as, but is not limited to, a wave peak wavelength, a wavelength of full width at half maximum, or a mean wavelength.

In some embodiments, the first filter characteristic is a first light transmittance, the second filter characteristic is a second light transmittance, and the first light transmittance is different from the second light transmittance. Therefore, the first area 140 and the second area 142 respectively perform filtering processing in different proportions according to the light intensity of the light L, and respectively output the light L with different light intensity.

Figure 3A:
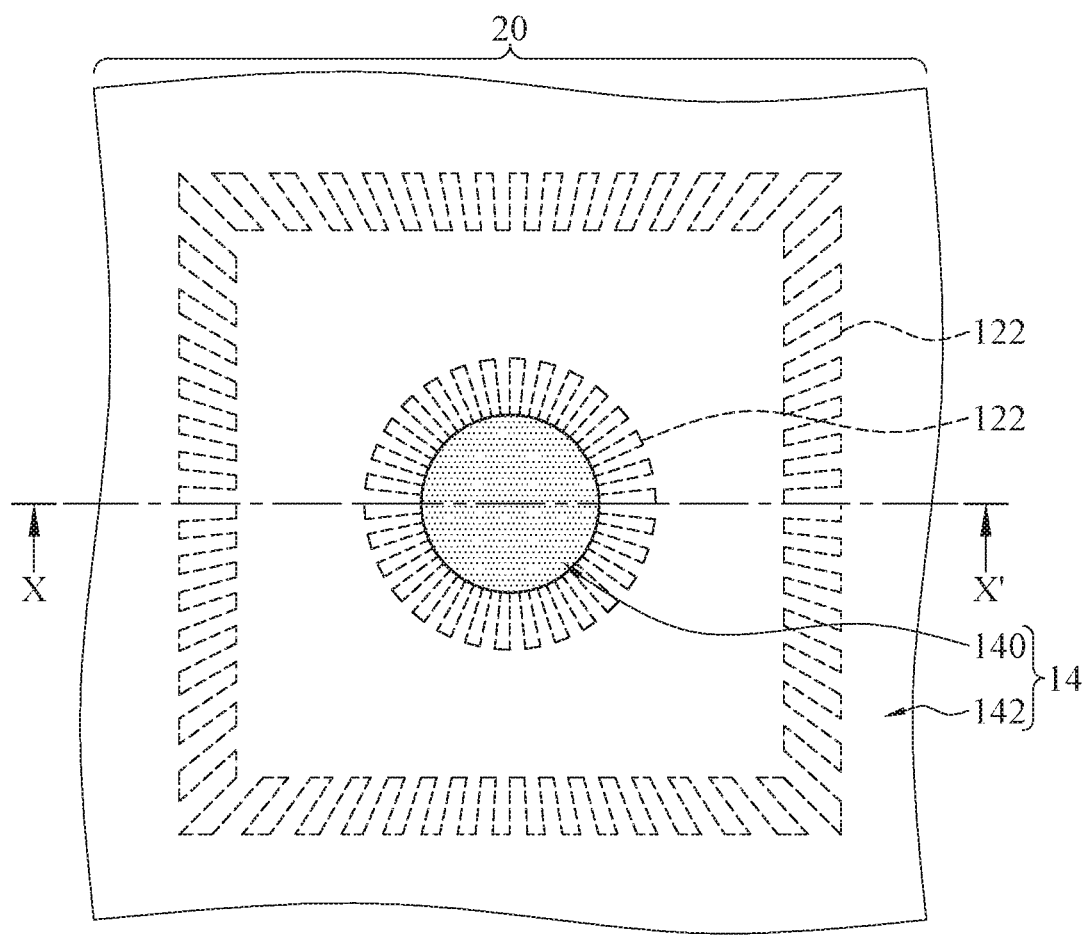
FIG. 3A is a schematic local top view of an illuminated module corresponding to a single key according to an embodiment.
Figure 3B:
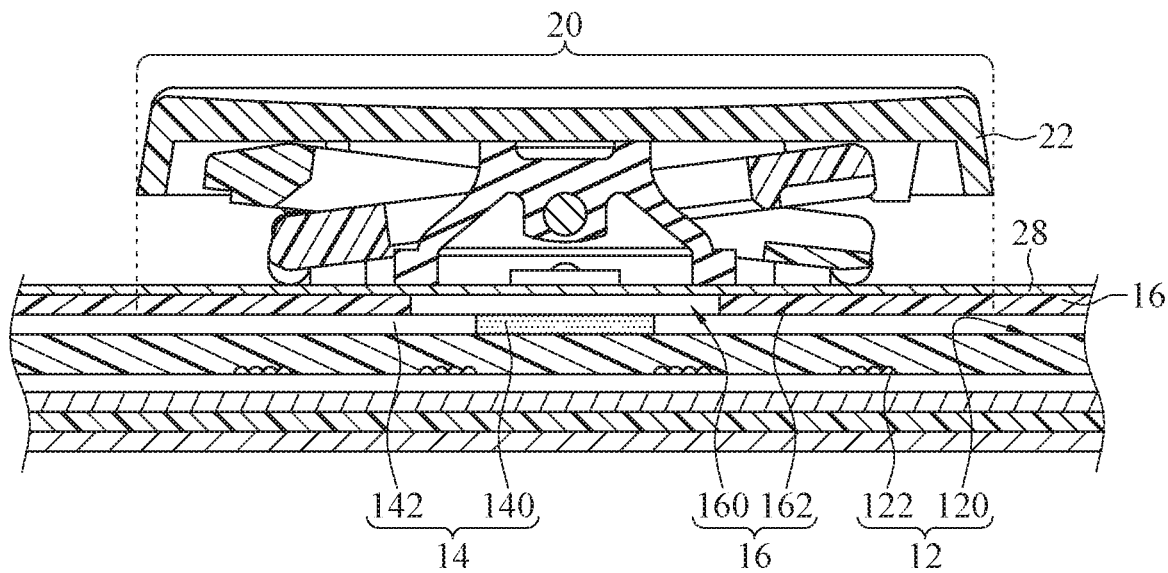
FIG. 3B is a schematic cross-sectional view of an illuminated keyboard shown in the embodiment in FIG. 3A in an XX' direction.

FIG. 3A is a schematic local top view of the illuminated module 1 corresponding to a single key 22 according to some embodiments (the keyboard assembly 2 is not included). FIG. 3B is a schematic cross-sectional view of the illuminated keyboard shown in the embodiment in FIG. 3A in an XX' direction. Referring to FIG. 3A and FIG. 3B together, in some embodiments, the keyboard assembly 2 includes a key 22. The key 22 is located on the light-shielding sheet 16, and an orthographic projection corresponding to the key 22 on the filter 14 is roughly overlapped on a single-key orthographic projection area 20, that is, the key 22 corresponds to the single-key orthographic projection area 20 in the filter 14. The first area 140 corresponds to the center of the single-key orthographic projection area 20, and the second area 142 surrounds the first area 140. In some embodiments, the center of the key 22 has a symbol annotation. The key 22 may be a semi-transparent material, or the symbol annotation of the key 22 is a semi-transparent design. Herein, the light L filtered by the first area 140 illuminates the symbol annotation on the key 22 after passing through the light-shielding sheet 16, and the light L filtered by the second area 142 illuminates an outer edge area of the surface of the key 22 after passing through the light-shielding sheet 16. As a whole, a gradient visual effect that the user visually perceives changes of hue/brightness, and the like is provided. In other embodiments, distribution locations of the first area 140 and the second area 142 are exchanged. That is, the light L filtered by the second area 142 illuminates the symbol annotation on the key 22 after passing through the light-shielding sheet 16, and the light L filtered by the first area 140 illuminates an outer edge area of the surface of the key 22 after passing through the light-shielding sheet 16.

Figure 4A:
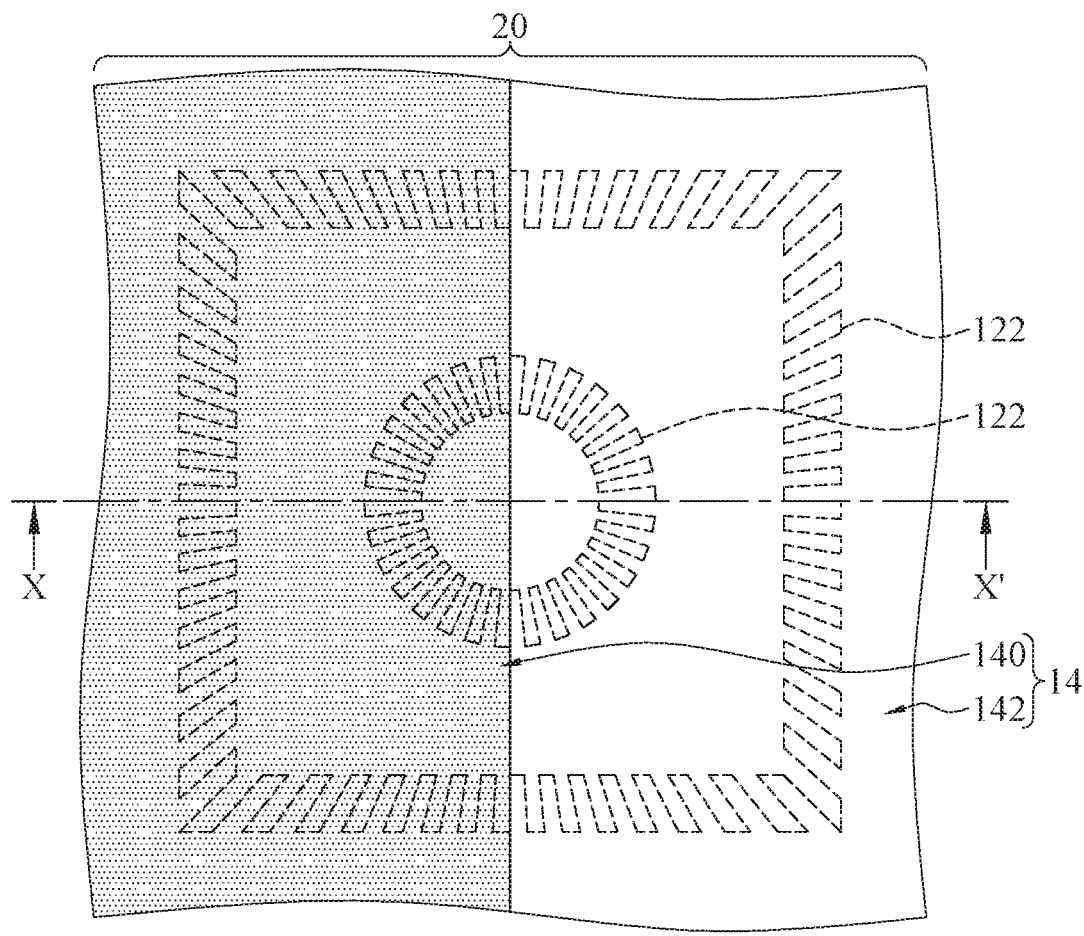
FIG. 4A is a schematic local top view of an illuminated module corresponding to a single key according to an embodiment.
Figure 4B:
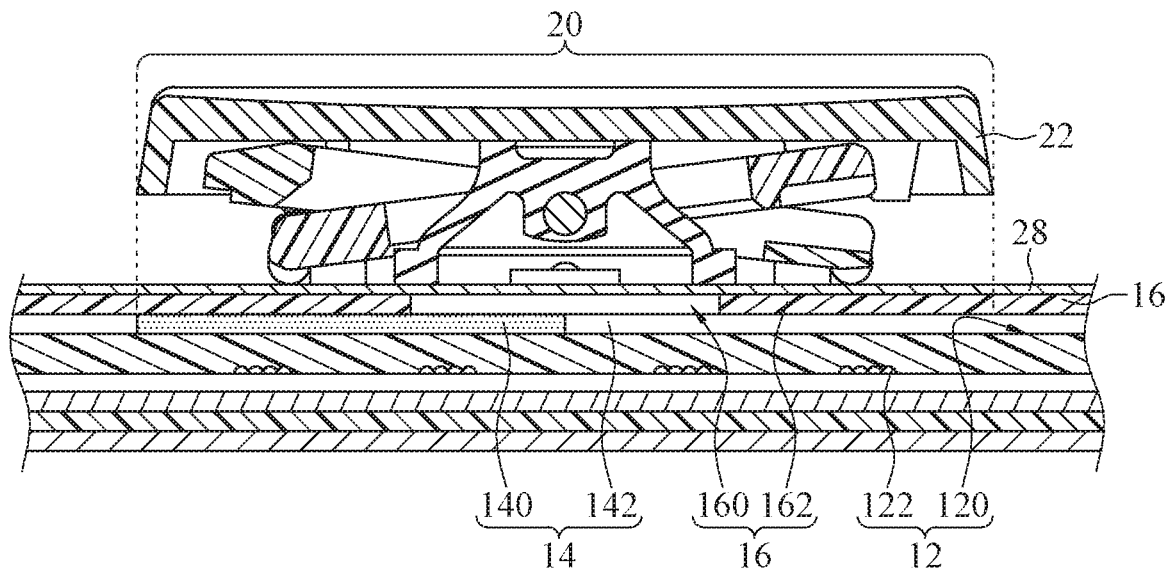
FIG. 4B is a schematic cross-sectional view of an illuminated keyboard shown in the embodiment in FIG. 4A in an XX' direction.

FIG. 4A is a schematic local top view of the illuminated module 1 corresponding to a single key 22 according to some embodiments (the keyboard assembly 2 is not included). FIG. 4B is a schematic cross-sectional view of the illuminated keyboard shown in the embodiment in FIG. 4A in an XX' direction. Referring to FIG. 4A and FIG. 4B together, in some embodiments, the keyboard assembly 2 includes a key 22. The key 22 is located on the light-shielding sheet 16, and an orthographic projection corresponding to the key 22 on the filter 14 is roughly overlapped on a single-key orthographic projection area 20, that is, the key 22 corresponds to the single-key orthographic projection area 20 in the filter 14. The first area 140 corresponds to a half area of the single-key orthographic projection area 20, and the second area 142 corresponds to the other half area of the single-key orthographic projection area 20. In some embodiments, the key 22 has a plurality of symbol annotations. The key 22 may be a semi-transparent material, or the plurality of symbol annotations of the key 22 are a semi-transparent design. Herein, the light L filtered by the first area 140 illuminates some symbol annotations on the key 22 after passing through the light-shielding sheet 16, and the light L filtered by the second area 142 illuminates the other symbol annotations on the key 22 after passing through the light-shielding sheet 16. As a whole, a gradient visual effect that the user visually perceives changes of hue/brightness, and the like is provided.

Figure 5A:
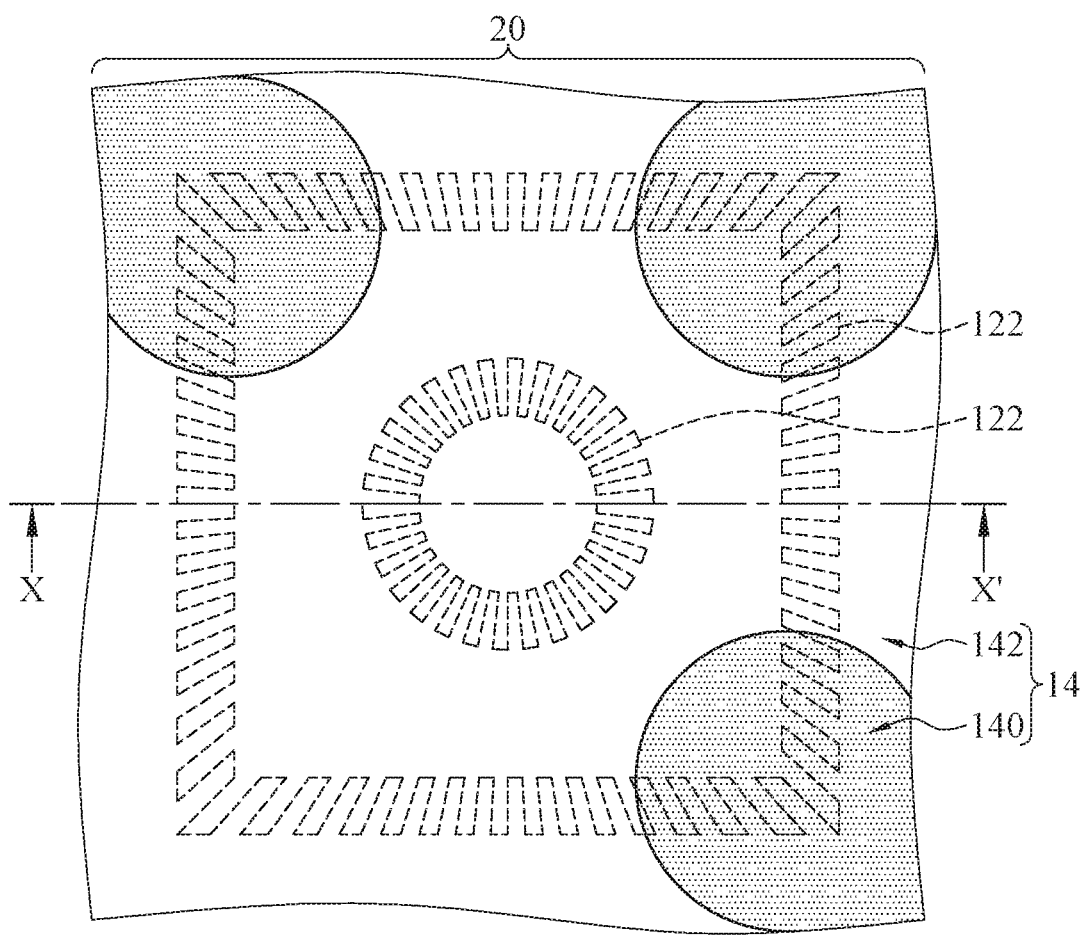
FIG. 5A is a schematic local top view of an illuminated module corresponding to a single key according to an embodiment.
Figure 5B:
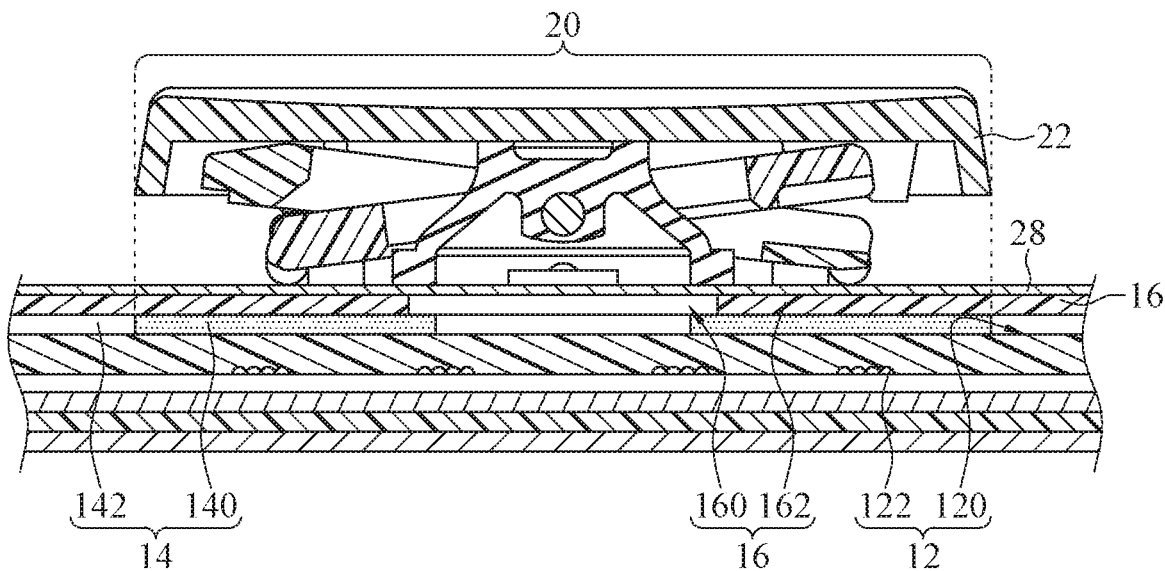
FIG. 5B is a schematic cross-sectional view of an illuminated keyboard shown in the embodiment in FIG. 5A in an XX' direction.

FIG. 5A is a schematic local top view of the illuminated module 1 corresponding to a single key 22 according to some embodiments (the keyboard assembly 2 is not included). FIG. 5B is a schematic cross-sectional view of the illuminated keyboard shown in the embodiment in FIG. 5A in an XX' direction. Referring to FIG. 5A and FIG. 5B together, in some embodiments, the keyboard assembly 2 includes a key 22. The key 22 is located on the light-shielding sheet 16, and an orthographic projection corresponding to the key 22 on the filter 14 is roughly overlapped on a single-key orthographic projection area 20, that is, the key 22 corresponds to the single-key orthographic projection area 20 in the filter 14. The second area 142 corresponds to the center of the single-key orthographic projection area 20, and the first area 140 is located on an outer periphery of the single-key orthographic projection area 20. In some embodiments, an upper periphery of the key 22 has a plurality of symbol annotations. The key 22 may be a semi-transparent material, or the plurality of symbol annotations of the key 22 are a semi-transparent design. Herein, the light L filtered by the first area 140 illuminates some symbol annotations on the upper periphery of the key 22 after passing through the light-shielding sheet 16, and the light L filtered by the second area 142 illuminates symbol annotations in the center of the key 22 after passing through the light-shielding sheet 16. As a whole, a gradient visual effect that the user visually perceives changes of hue/brightness, and the like is provided.

Figure 6A:
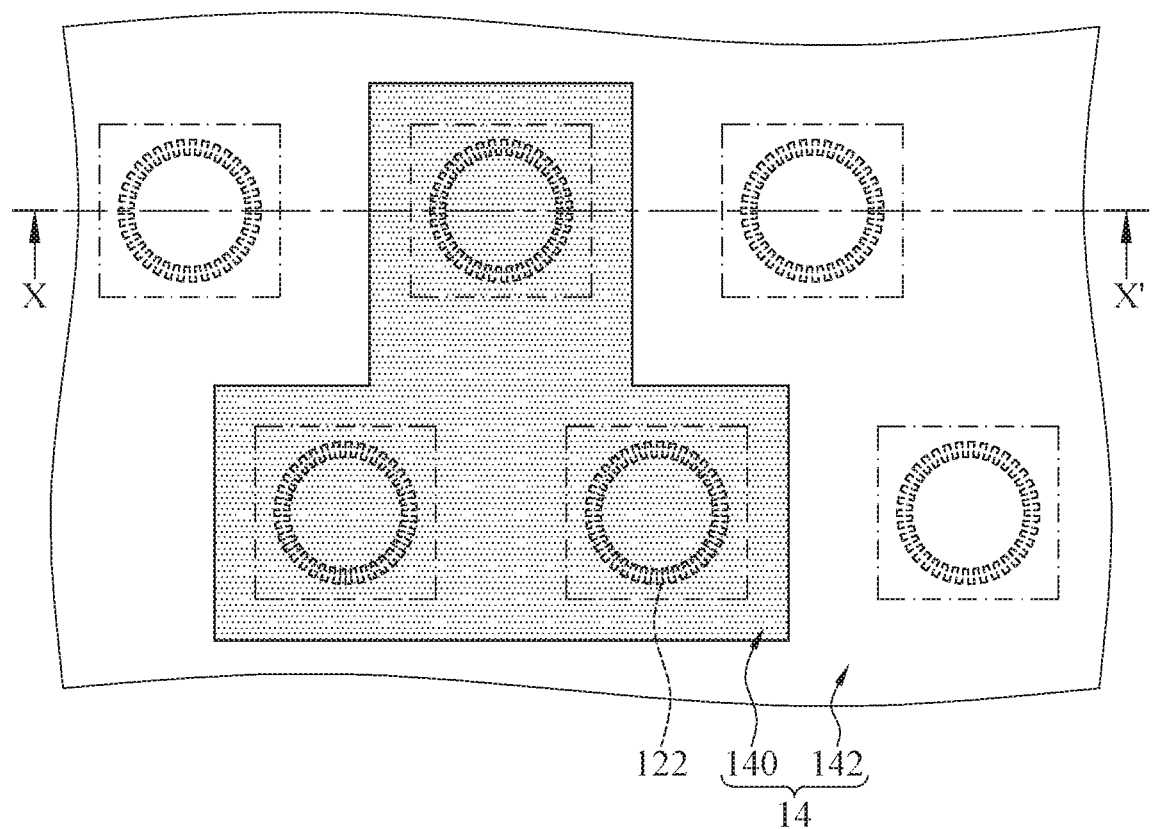
FIG. 6A is a schematic local top view of an illuminated module corresponding to a single key according to an embodiment.
Figure 6B:
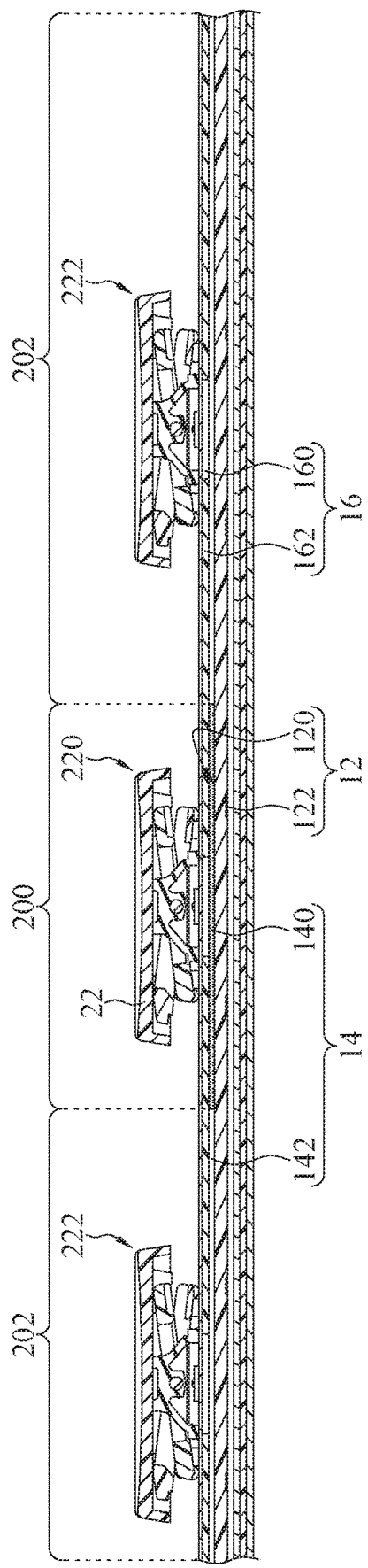
FIG. 6B is a schematic cross-sectional view of an illuminated keyboard shown in the embodiment in FIG. 6A in an XX' direction.

FIG. 6A is a schematic local top view of the illuminated module 1 corresponding to a single key 22 according to some embodiments (the keyboard assembly 2 is not included). FIG. 6B is a schematic cross-sectional view of the illuminated keyboard shown in the embodiment in FIG. 6A in an XX' direction. Referring to FIG. 6A and FIG. 6B together, in some embodiments, the keyboard assembly 2 includes a plurality of keys 22. As shown in FIG. 6B, the plurality of keys 22 are divided into a first key area 220 and a second key area 222, respectively corresponding to the first area 140 and the second area 142 shown in FIG. 6A. Further, the first area 140 corresponds to a plurality of keys 22 of the first key area 220. The plurality of keys 22 are located on the light-shielding sheet 16, and orthographic projections of the keys on the filter 14 are roughly overlapped on a first orthographic projection area 200. That is, the first area 140 corresponds to the first orthographic projection area 200 corresponding to the first key area 220 on the filter 14. On the other hand, the second area 142 corresponds to a plurality of keys 22 of the second key area 222. The plurality of keys 22 are located on the light-shielding sheet, and orthographic projections corresponding to the keys on the filter 14 are roughly overlapped on a second orthographic projection area 202. That is, the second area 142 corresponds to the second orthographic projection area 202 corresponding to the second key area 222 on the filter 14. Herein, the light L filtered by the first area 140 illuminates the first key area 220 after passing through the light-shielding sheet 16, and the light L filtered by the second area 142 illuminates the second key area 222 after passing through the light-shielding sheet 16. As a whole, a highlight visual effect that a user visually perceives displaying in different areas is provided.

Referring to FIG. 2 again, in some embodiments, the light guide plate 12 has a first opening T1, the filter 14 has a second opening T2, and the light-shielding sheet 16 has a third opening T3. The first opening T1, the second opening T2, and the third opening T3 vertically correspond to each other to form a through hole T. Herein, the light L enters the interior of the light guide plate 12 from a side wall of the first opening T1 of the light guide plate 12, and illuminates the entire light guide plate 12 through a total reflection effect, to improve a light utilization rate.

In some embodiments, the light source assembly 10 further includes a substrate 104, a circuit layer 106, and a reflective layer 108. The light-emitting component 100 is electrically connected to the circuit layer 106, and the circuit layer 106 is electrically connected to the flat cable 109 shown in FIG. 1. Therefore, an external device may control an illuminated state of the light-emitting component 100 by using the flat cable 109 and the circuit layer 106. The reflective layer 108 is configured to reflect the light L scattered by the light-emitting component 100 and the light L leaked from the bottom 121 of the light guide plate 12, thereby increasing an amount of light that enters the light guide plate 12 for total reflection transmission. In some embodiments, the circuit layer 106 and the reflective layer 108 are respectively manufactured on the substrate 104 in a printing manner. In some embodiments, the circuit layer 106 and the reflective layer 108 may be manufactured on the substrate 104 in a printing and/or coating manner. The substrate 104 and the circuit layer 106 may be referred to as a circuit board. The circuit board may be, but is not limited to, a flexible printed circuit board (FPCB).

Figure 7:
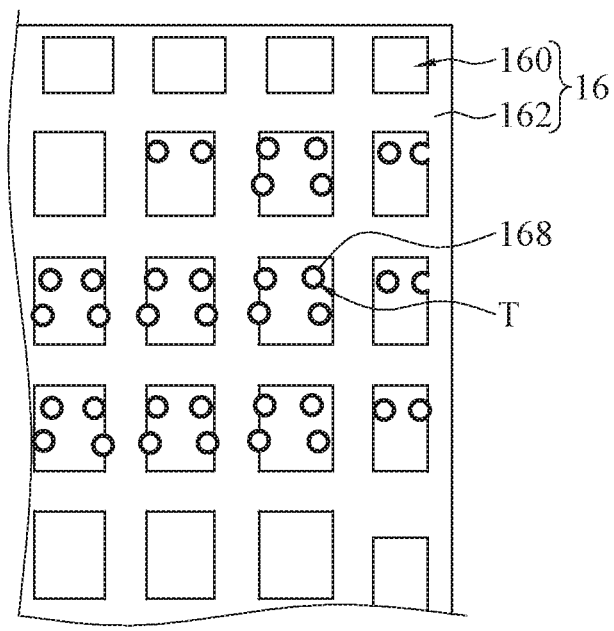
FIG. 7 is a schematic local top view of a light-shielding sheet according to an embodiment.

FIG. 7 is a schematic local top view of the light-shielding sheet 16. In some embodiments, an outer surface of the light-shielding sheet 16 further has a light-shielding ring 168. A quantity of the light-shielding rings 168 corresponds to a quantity of the through holes T, and the light-shielding ring 168 surrounds the through hole T. In other words, the light-shielding ring 168 has an opening, and the opening vertically corresponds to the through hole T. In some embodiments, viewing from the top, an inner edge of the light-shielding ring 168 vertically corresponds to an inner side of an outer edge of the key 22. Therefore, the user may not have a dazzling feeling because the light L emitted through the through hole T toward the key 22 does not pass through a key gap between two adjacent keys 22. In some embodiments, the light-shielding ring 168 is a light-shielding thin film, and is manufactured on the light-shielding sheet 16 in a printing or sticking manner. In some embodiments, the light-shielding ring 168 is a light-shielding thin film, and is manufactured on the light guide plate 12 in a printing or sticking manner.

Figure 8:
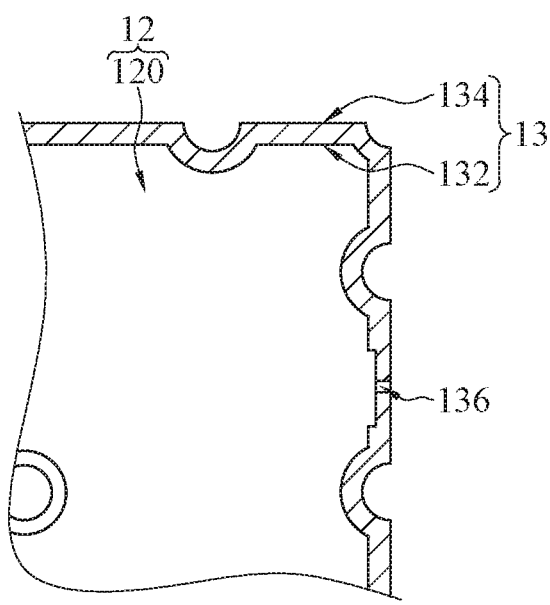
FIG. 8 is a schematic local top view of a light guide plate according to an embodiment.

FIG. 8 is a schematic local top view of the light guide plate 12. In some embodiments, the illuminated module 1 further includes a glue film 13. The glue film 13 is located between the filter 14 and the light-shielding sheet 16, and is located on the filter 14 and an outer periphery of the light-shielding sheet 16. The glue film 13 is configured to glue the filter 14 and the light-shielding sheet 16. In an example, the glue film 13 is in a shape of ring, and has a channel 136 at a ring edge. There may be one or more channels 136. An inner side 132 and an outer side 134 of the glue film 13 are in communication with each other through the channel 136, and the channel 136 is used as a gas escaping structure in communication with an internal environment and an external environment of the illuminated module 1. Therefore, the illuminated module 1 has a gas escaping structure of which two sides respectively in communication with the internal environment and the external environment. The gas escaping structure enables the internal air pressure and the external air pressure of the illuminated module 1 to be balanced and similar, to avoid damage and failure of the internal components of the illuminated module 1 due to air expansion. Product reliability of the illuminated module 1 may be improved by using the gas escaping structure.

In conclusion, according to some embodiments, the illuminated module 1 performs filtering processing in different proportions according to optical characteristics, such as light intensity and a light wavelength, through the first area 140 and the second area 142 that have different filter characteristics in the filter 14 and by using the filter 14 located between the light-shielding sheet 16 and the light guide plate 12, so that light L irradiated on the keyboard assembly 2 generates a visual effect change, and backlight with different colors/saturations/brightness is displayed to highlight specific keys 22. Therefore, it is convenient for a user to view, and the user can correctly press a required key 22 in an environment without light. For a user, some keys 22 have specific operation functions and are pressed frequently. For example, keys 22 such as W, A, S and D are respectively directional function keys usually used in specific scenarios. According to some embodiments, the illuminated module 1 can illuminate keys 22 having specific functions in the keyboard assembly 2. Backlight with different colors is displayed in different areas to highlight locations of the keys and marked characters, which helps improve efficiency and accuracy of a human-factor interface operation of the illuminated keyboard.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An illuminated keyboard, comprising:
    an illuminated module, comprising:
    a light source assembly, comprising a light-emitting component, the light-emitting component being configured to emit light;
    a light guide plate, on a traveling route of the light, and having a surface and a microstructure, the microstructure being configured to change a propagation direction of the light incident on the microstructure toward the surface;

a filter, located on the surface, and having a first area and a second area, the first area and the second area corresponding to the microstructure, wherein the first area has a first filter characteristic, the second area has a second filter characteristic, and the first filter characteristic is different from the second filter characteristic; and a light-shielding sheet, on an other side of the filter opposite to the light guide plate, and having a transparent opening, the transparent opening corresponding to the microstructure; and a keyboard assembly, above the light-shielding sheet, wherein the transparent opening faces toward the keyboard assembly;

wherein the light guide plate has a first opening, the filter has a second opening, and the light-shielding sheet has a third opening, wherein the first opening, the second opening, and the third opening vertically correspond to each other to form a through hole.

2. The illuminated keyboard according to claim 1, wherein the first filter characteristic is a first filter wave band, the second filter characteristic is a second filter wave band, and the first filter wave band is different from the second filter wave band.

3. The illuminated keyboard according to claim 1, wherein the first filter characteristic is a first light transmittance, the second filter characteristic is a second light transmittance, and the first light transmittance is different from the second light transmittance.

4. The illuminated keyboard according to claim 1, wherein the keyboard assembly comprises a key, the key corresponds to a single-key orthographic projection area in the filter, the first area corresponds to the center of the single-key orthographic projection area, and the second area surrounds the first area.

5. The illuminated keyboard according to claim 1, wherein the keyboard assembly comprises a key, the key corresponds to a single-key orthographic projection area in the filter, the first area corresponds to a half area of the single-key orthographic projection area, and the second area corresponds to an other half area other than the half area.

6. The illuminated keyboard according to claim 1, wherein the keyboard assembly comprises a plurality of keys, the plurality of keys are divided into a first key area and a second key area, the first area corresponds to a first orthographic projection area in the filter corresponding to the first key area, and the second area corresponds to a second orthographic projection area in the filter corresponding to the second key area.

7. The illuminated keyboard according to claim 1, wherein an outer surface of the light-shielding sheet further has a light-shielding ring, surrounding the through hole.

8. The illuminated keyboard according to claim 1, wherein the illuminated module further comprises a glue film, the glue film being between the filter and the light-shielding sheet, on the filter and an outer periphery of the light-shielding sheet, and configured to glue the filter and the light-shielding sheet, the glue film having a channel, and an inner side and an outer side of the glue film being in communication with each other through the channel.

9. An illuminated module, comprising:
a light source assembly, comprising a light-emitting component, the light-emitting component being configured to emit light;
a light guide plate, on a traveling route of the light, and having a surface and a microstructure, the microstructure being configured to change a propagation direction of the light incident on the microstructure toward the surface;
a filter, located on the surface, and having a first area and a second area, the first area and the second area corresponding to the microstructure, wherein the first area has a first filter characteristic, the second area has a second filter characteristic, and the first filter characteristic is different from the second filter characteristic; and
a light-shielding sheet, on an other side of the filter opposite to the light guide plate, and having a transparent opening, the transparent opening corresponding to the microstructure;
wherein the light guide plate has a first opening, the filter has a second opening, and the light-shielding sheet has a third opening, wherein the first opening, the second opening, and the third opening vertically correspond to each other to form a through hole.

10. The illuminated module according to claim 9, wherein the first filter characteristic is a first filter wave band, the second filter characteristic is a second filter wave band, and the first filter wave band is different from the second filter wave band.

11. The illuminated module according to claim 9, wherein the first filter characteristic is a first light transmittance, the second filter characteristic is a second light transmittance, and the first light transmittance is different from the second light transmittance.

12. The illuminated module according to claim 9, wherein an outer surface of the light-shielding sheet further has a light-shielding ring, surrounding the through hole.

13. The illuminated module according to claim 9, further comprising a glue film, the glue film being between the filter and the light-shielding sheet, on the filter and an outer periphery of the light-shielding sheet, and configured to glue the filter and the light-shielding sheet, the glue film having a channel, and an inner side and an outer side of the glue film being in communication with each other through the channel.

14. An illuminated module, comprising:
a light source assembly, comprising a light-emitting component, the light-emitting component being configured to emit light;
a light guide plate, on a traveling route of the light, and having a surface and a microstructure, the microstructure being configured to change a propagation direction of the light incident on the microstructure toward the surface;
a filter, located on the surface, and having a first area and a second area, the first area and the second area corresponding to the microstructure, wherein the first area has a first filter characteristic, the second area has a second filter characteristic, and the first filter characteristic is different from the second filter characteristic;
a light-shielding sheet, on an other side of the filter opposite to the light guide plate, and having a transparent opening, the transparent opening corresponding to the microstructure; and
a glue film, the glue film being between the filter and the light-shielding sheet, on the filter and an outer periphery of the light-shielding sheet, and configured to glue the filter and the light-shielding sheet, the glue film having a channel, and an inner side and an outer side of the glue film being in communication with each other through the channel.

* * * * *